Figure 1:
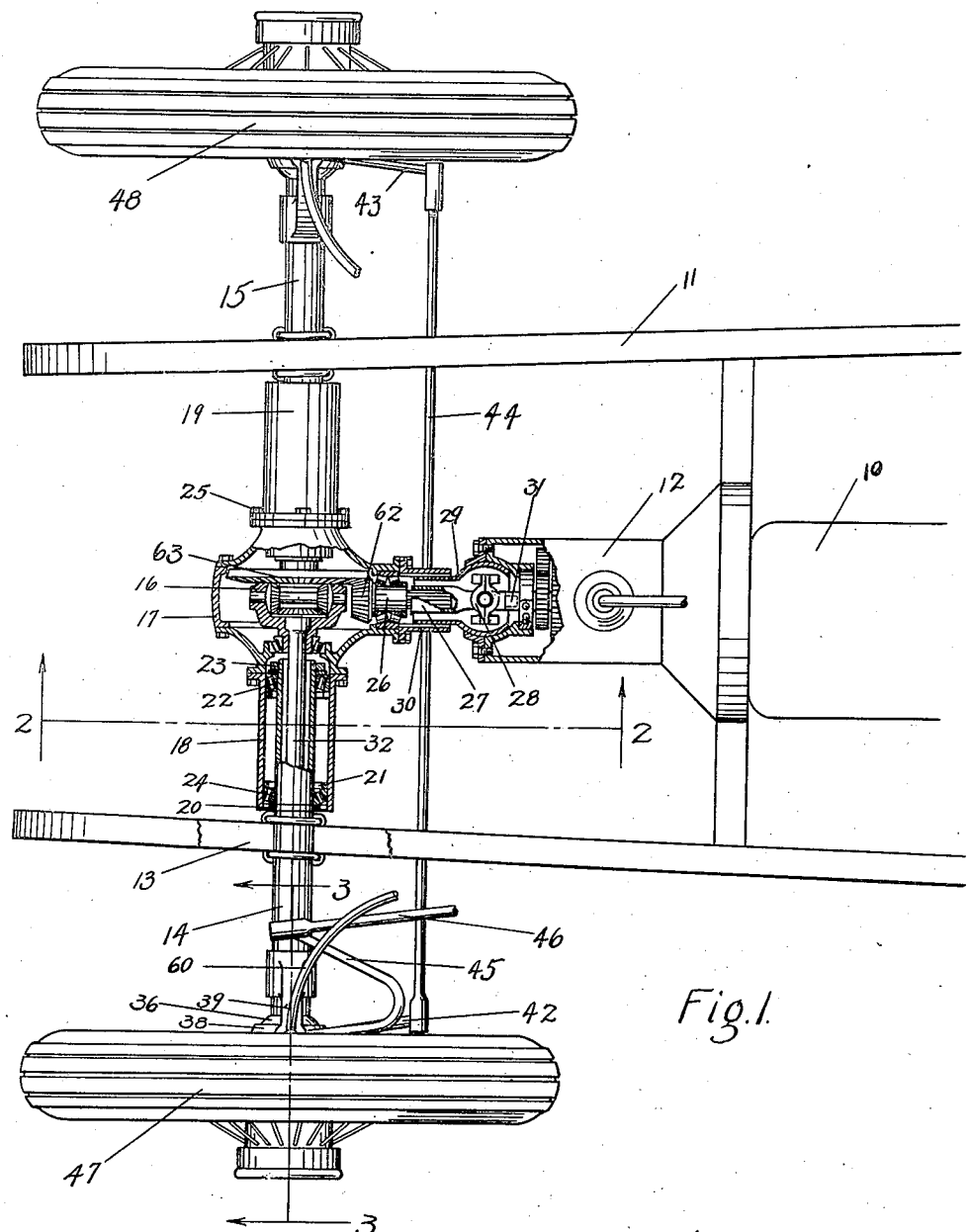

Dec. 1, 1931.  J. R. SLUDER  1,834,354

FRONT WHEEL DRIVE STRUCTURE

Filed Jan. 31, 1931  2 Sheets-Sheet 1

Inventor,
John R. Sluder,
By Minturn & Minturn,
Attorneys.

Dec. 1, 1931.  J. R. SLUDER  1,834,354
FRONT WHEEL DRIVE STRUCTURE
Filed Jan. 31, 1931  2 Sheets-Sheet 2
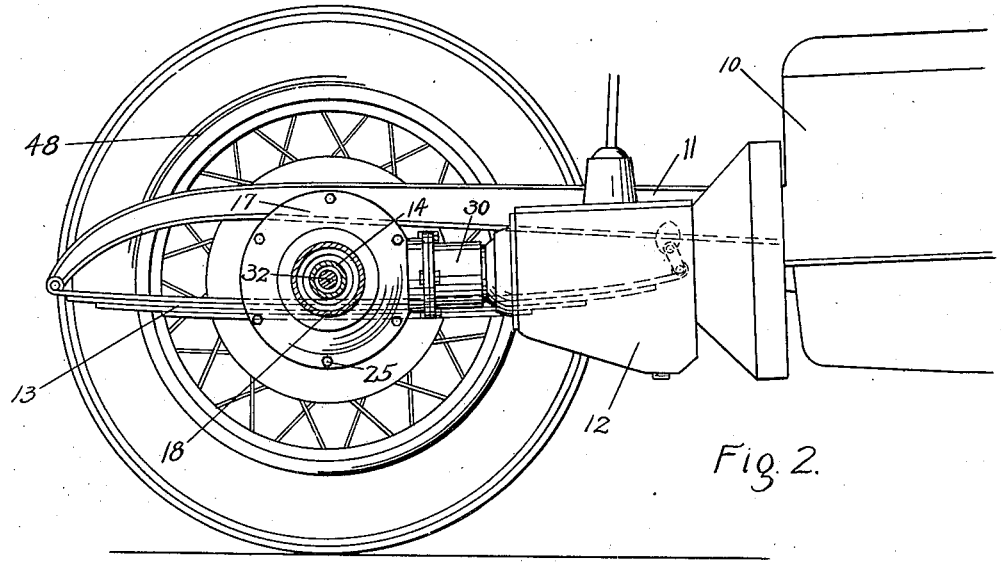
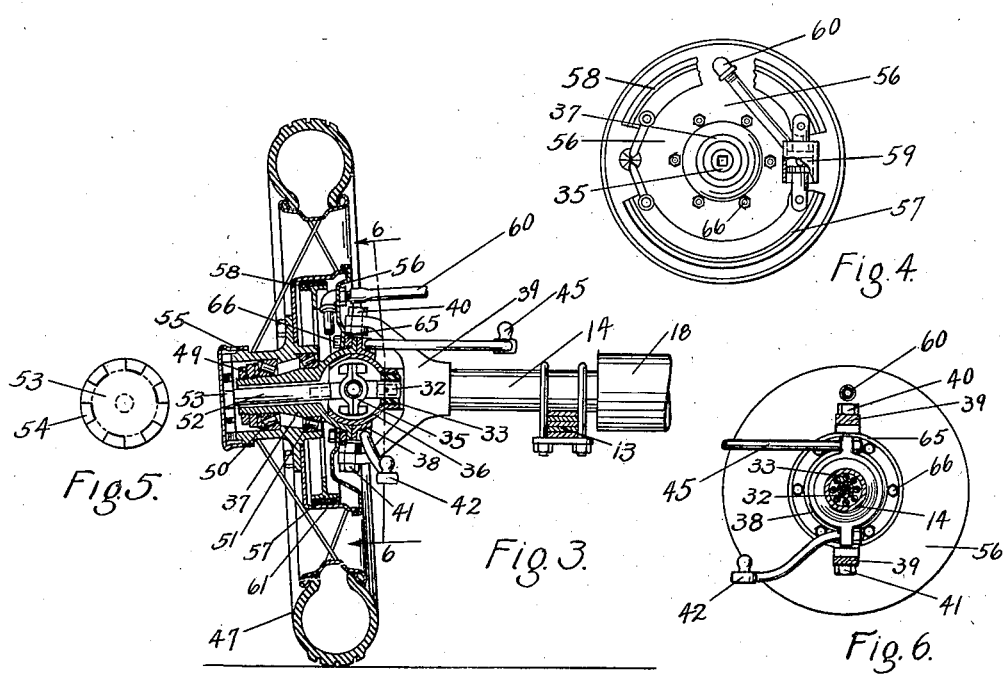
Inventor,
John R. Sluder,
By Minturn & Minturn,
Attorneys.

Patented Dec. 1, 1931

1,834,354

UNITED STATES PATENT OFFICE

JOHN E. SLUDER, OF ZIONSVILLE, INDIANA, ASSIGNOR OF ONE-HALF TO RAPHAEL P. BUNDY, OF ZIONSVILLE, INDIANA

FRONT WHEEL DRIVE STRUCTURE

Application filed January 31, 1931. Serial No. 512,715.

This invention relates to the art of front wheel drives for automobiles and the like and particularly to a structure having the driving engine carried by a spring supported frame with shaft means communicating power from the engine to front steerable wheels mounted on a load carrying axle.

A primary object of my invention is to provide a front wheel drive in which the vehicle load is carried directly upon the axle which receives the power drive without having to employ a separate load carrying axle.

A primary object of my invention is to provide a drive from a spring supported engine in which the shafts are completely enclosed and a minimum number of universal joints are employed.

A primary object of my invention also resides in the particular manner in which a differential mechanism is mounted on the front axle to permit vertical travel of the axle in relation to the driving engine.

A further important object of the invention is to provide a front wheel drive of extremely simplified structure whereby it may be employed in comparatively low priced automobiles.

These and other objects such as the low unsprung weight secured and the use of a combination permitting the employment of the standard semi-elliptic front springs, and the new and useful combinations of the particular elements will become apparent in the following description of the invention as illustrated in the accompanying drawings, in which Fig. 1 is a fragmentary top plan view of a front wheel drive assembly employed in my invention;

Fig. 2, a longitudinal transverse section on the line 2—2 in Fig. 1;

Fig. 3, a transverse vertical section on the line 3—3 in Fig. 1;

Fig. 4, a detail in outside elevation of the brake shoe supporting disc;

Fig. 5, an end view elevation of the wheel driving shaft; and

Fig. 6, a vertical section on the line 6—6 in Fig. 3.

Like characters of reference indicate like parts throughout the several views.

I support an engine 10 on the chassis frame 11 to have a speed change transmission 12 secured to its forward end. Each side of the frame 11 is supported in the usual manner by semi-elliptic springs 13 here shown as being in underslung arrangement with the tubular axles 14 and 15 respectively. Instead of being one integral piece as heretofore been the practice, the axles 14 and 15 are separated for a distance from each side of the center line of the chassis to receive therebetween a differential mechanism 16 rotatably carried in the usual manner in a housing 17.

The differential housing 17 has a flange on each side to which are bolted the sleeves 18 and 19. These sleeves extend around and along the axles 14 and 15 respectively, their lengths being limited by the distances between the housing flanges and the springs 13. In practice, these sleeves 18 and 19 are first assembled on the respective axle sections 14 and 15 before being bolted to the housing flanges. For example, referring to the assembly of the sleeve 18 on the axle 14, Fig. 1, a roller thrust bearing 24 is slipped over the inner end of the axle 14 to have its inner race abut a collar or ring 20 held in fixed position on the axle.

The outer race of this bearing is frictionally held within the sleeve 18 to abut against a fixed ring 21. In the other end of the sleeve 18 is carried a similar roller bearing 22 having the outer race thereof secured in the sleeve end and the inner race slidable along the axle 14 to be adjustably secured by the nut 23 screw-threadedly carried on the inner end of the axle 14. By suitable adjustment of this nut 23, the sleeve 18 is thus rotatably mounted and adjusted to eliminate end play on the axle 14 and secured against longitudinal displacement. The sleeve 19 is rotatably adjusted and secured on the axle 15 in exactly the same manner.

The differential housing 17 may then be secured between and to the sleeves 18 and 19 by the bolts 25 through the flanges on each side thereof. The housing 17 is positioned about the axles 14 and 15 to have the pinion gear shaft 26 extend rearwardly therefrom and to have a splined slip joint within the stub shaft 27 extending forwardly from a universal joint 28 mounted in the forward end of the transmission 12.

A sleeve housing 29 surrounds the stub shaft 27 and has a ball housing on its rear end rotatably retained within a receiving cup in the forward end of the transmission 12. A sleeve 30 is fixed to the rear end of the housing 17 to receive therewithin the housing 29 with a longitudinal sliding fit. The universal joint 28 is directly connected to the driven shaft 31 of the transmission 12.

Referring now principally to Fig. 3, a drive shaft 32 driven by its inner end from the differential mechanism 16 extends freely through the axle 14 to have its outer end supported by the roller bearing 33 in the axle 14 and to extend therebeyond to carry the universal joint 35 on its outer end within the hollow open end ball 36 which is formed to be an integral part of the outer end of the axle 14. A wheel spindle 37 has an inner cupped end to fit about the outer portion of the ball 36 and a cupped flange 38 is drawn over the ball from the inner side to be bolted to a corresponding flange on the cupped end of the spindle 37 by the bolts 66 as a means of rotatably maintaining the spindle in engagement with the axle 14. Now to prevent vertical rotation of the spindle 37, a yoke 39 is fixed on the axle 14 to have arms extending outwardly above and below the ball joint. King pin bolts 40 and 41 are rotatably passed through the ends of these arms of the yoke on a common axis in substantially a vertical plane to screw-threadedly engage within bosses extending inwardly from a ring 65 which is held against the flange of the spindle by the bolts 66. The lengths of the arms are proportioned one to the other so as to cause the spindle 37 to be carried at a slight angle to the axle 14 in order to obtain the desired camber.

Tie rod arms 42 and 43 are secured respectively to the under sides of the flanges 38 and a tie rod 44 interconnects their rear ends in the usual and customary manner. A steering arm 45 is secured to the upper side of the left hand side flange 38 to extend around and over the axle 14 to be engaged in the usual manner by a drag link 46. Wheels 47 and 48 of any type, here shown as wire spoke wheels are revolvably mounted on the spindle 37 and are secured by the lock nuts 49 screw-threadedly engaging over the outer ends of the spindles 37, the nuts 47 being employed to properly adjust the bearings 50 and 51 which carry the wheels.

The spindles 37 are hollow and drive shafts 52 are freely inserted therethrough to have their inner ends slidably engage the universals 35. The outer end of the shaft 52 has a disc 53 fixed thereon which disc has a plurality of notches formed in its periphery to receive therein teeth 54 which project laterally from the wheel hub. The shaft 52 is pushed through the spindle 37 to not only have its inner end engage the universal 35 but also to have the disc 53 carried inwardly to have the wheel teeth 54 project into the notches of the disc whereby rotation of the shaft 52 will cause corresponding rotation of the wheel. The shaft 52 is maintained in position by means of a hub cap 55 which screw-threadedly engages about the wheel hub and contacts with the disc 53.

A disc 56 is fixed to the spindle 37 at the flanged end by the bolts 66 and carries the brake shoes 57 and 58 which are here shown as being operated by a hydraulic cylinder 59 to which leads a fluid pipe 60. The wheel hub carries a brake drum 61 which fits over the brake shoes 57 and 58 in the usual manner.

It will be observed that power from the engine 10, by the structure I have described and illustrated, may be transmitted from through the transmission 12 to the universal joint 28, the slip joint formed between the shafts 27 and 26, thence through the pinion gear 62, the ring gear 63, the axle shafts 32, the universals 35, and the shafts 52 to the wheels 47 and 48. The wheels may be steered in the usual manner by fore and aft travel of the drag link 46 to move the spindles 37 in substantially horizontal planes about the ball ends of the axles 14 and 15 and at the same time permit driving power to be transmitted to the wheels through the universal joints.

Also it may be observed that free spring action is maintained since vertical lift of either or both wheels 47 and 48 in reference to the frame 11 may be had, during which action the sleeves 18 and 19 may revolve relatively about the axles 14 and 15 and a sliding movement may also be permitted between the shafts 26 and 27, all securely enclosed. There may also be a vertical rotation between the transmission 12 and the housing 29, either longitudinally of the frame 11 or in transverse relation thereto.

It will thus be observed that I have devised a structure which completely encloses all of the moving parts and which eliminates the necessity of having to have a separate load carrying axle. My structure permits free spring action and also free steering of the wheels, all in a simple manner capable of being manufactured and assembled at a relatively low cost of production.

While I have here shown my invention in the form as now best known to me, it is obvious that structural changes may be made without departing from the spirit of the invention, and I, therefore, do not desire to be limited to that precise form, nor any more than may be required by the following claims.

I claim:

1. In combination with a frame and an engine carried by the frame, a pair of axles aligned axially, springs between the axles and the frame, a differential mechanism rotatably supported by and between said axles, extensible and retractible shaft driving means between said differential mechanism and said engine, wheel spindles pivotally supported by the axles, drive shafts from said differential mechanism extending through said axles and spindles, and universal joints in said drive shafts at the pivot points of said spindles.

2. The combination of two tubular axle sections, a sleeve rotatably carried on each of the sections, a differential mechanism between and fixed to each of the sleeves, and an axle shaft extending from the differential mechanism through each of the axle sections.

3. In an axle, two tubular axle sections, a yoke on the outer end of each section, a spindle rotatably secured to the outer end of each section by a hollow ball joint, king pin means between said yokes and said spindles limiting rotation of the spindles to substantially horizontal planes, a sleeve extending over the major portion of each axle section, bearing means between the sleeves and the sections, a differential mechanism secured to each of said sleeves, a drive shaft extending from said mechanism through each of said axle sections, a universal joint in each of said spindle joints receiving the outer ends of said drive shafts, and wheel driving shafts insertable through said spindles to engage said universal joints.

4. In a front wheel drive, hollow load supporting axle members, a differential mechanism revolvably supported by said members, wheel driving shafts extending from said mechanism through said members, a speed change transmission spring supported in relation to said members, a driving shaft between said mechanism and said transmission, and universal joint means in said driving shaft.

5. In a front wheel drive, hollow load supporting axle members, a differential mechanism revolvably supported by said members, wheel driving shafts extending from said mechanism through said members, a speed change transmission spring supported in relation to said members, a driving shaft between said mechanism and said transmission, and universal joint means in said driving shaft, an extensible housing between said mechanism and said transmission about said driving shaft, and universal connecting means between said housing and said transmission fixing the center of travel of said mechanism at said transmission.

6. In a front wheel drive, a pair of axially aligned tubular load carrying axles, vehicle springs holding the axles in fixed positions, a differential mechanism having a housing, a sleeve fixed to and extending from each side of the housing to telescope rotatably with said axles whereby bending stresses in the axles are transmitted through said housing and said mechanism is disposed between the inner ends of said axles, and an individual drive shaft extending from the differential mechanism to each side thereof to extend into each respective axle.

7. The combination of two axially aligned, spaced apart load carrying axle sections, a sleeve rotatably carried by each of said sections, a differential mechanism carried by and between said sleeves in fixed relation thereto to be between said sections, and a driving shaft divided at the differential mechanism to rotatably extend through each of the axle sections.

In testimony whereof I affix my signature.

JOHN R. SLUDER.